Fig. 1.

Oct. 23, 1934.    L. G. BOWMAN    1,978,291
COMBINED SEAMING AND PINKING MACHINE
Filed Sept. 19, 1932    9 Sheets-Sheet 2

Inventor
Louis G. Bowman.
By S. George Tate
Attorney

Inventor
Louis G. Bowman
By S. George Tate
Attorney

Oct. 23, 1934.   L. G. BOWMAN   1,978,291
COMBINED SEAMING AND PINKING MACHINE
Filed Sept. 19, 1932   9 Sheets-Sheet 4

Inventor
Louis G. Bowman.
By S. George Tate
Attorney

Oct. 23, 1934.  L. G. BOWMAN  1,978,291
COMBINED SEAMING AND PINKING MACHINE
Filed Sept. 19, 1932  9 Sheets-Sheet 7

Inventor
Louis G. Bowman.
By S. George Tate
Attorney

Oct. 23, 1934.    L. G. BOWMAN    1,978,291
COMBINED SEAMING AND PINKING MACHINE
Filed Sept. 19, 1932    9 Sheets-Sheet 9

Inventor
Louis G. Bowman.
By S. George Tate
Attorney

Patented Oct. 23, 1934

1,978,291

UNITED STATES PATENT OFFICE 1,978,291

COMBINED SEAMING AND PINKING MACHINE

Louis G. Bowman, St. Louis, Mo., assignor to Lewis Invisible Stitch Machine Company, St. Louis, Mo., a corporation of Maine Application September 19, 1932, Serial No. 633,894

28 Claims. (Cl. 112—122)

This invention relates to new and useful improvements in sewing machines especially adapted for simultaneously performing seaming and pinking or trimming operations. Machines of this character are exemplified in the copending applications for patents filed respectively on August 6, 1930; March 13, 1931 and June 20, 1932 by Horace F. Gruman, and respectively identified by Serial Numbers 473,404, now Patent 1,891,308; 522,312 and 618,383.

In each of the machines of the applications mentioned the pinking or trimming knife or blade and its supporting and driving connections are mounted and operate above the machine base or work support and are supported either by the overhanging arm or the base in such a manner as to constitute obstructions to free use of the machine for normal non-pinking operations. These machines embody various means for silencing the pinking or trimming knife or blade but such devices naturally tend to complicate and render more costly the pinking or trimming mechanisms and enable only partial removal of said obstructions.

Therefore, in addition to the novelty in the way of simplicity of construction and arrangement of the elements embodied therein my invention seeks among other objects to provide a combined seaming and pinking or trimming equipment in which the pinking or trimming mechanism is mounted wholly below the work supporting level of the machine base so as to entirely eliminate work feeding and handling obstructions and enable use of the machine at will for pinking or trimming, or normal non-pinking or trimming operations without the need of any part adjustment or removal.

Another object of the invention is to provide novel means for driving the pinking or trimming knife or blade.

Another object of the invention is to provide novel means actuated by the knife or blade operating devices for yieldably holding the pinking or trimming elements in tensioned shearing relation during actual cutting and for relieving such shearing relation when not actually cutting.

Another object of the invention is to provide novel work guiding and controlling means enabling pinking or trimming of the work edge or edges in vertically disposed relation and which serves to thereafter position the pinked or trimmed edges in the plane of the main body of the work.

Another object of the invention is to provide a number of novel forms of seams which may be made by hand or by use of my improved machine, together with novel methods of forming such seams.

With these and other objects in view which will more fully appear, the nature of the invention will be more clearly understood by following the description, the appended claims, and the several views illustrated in the accompanying drawings.

In the drawings:—

Figure 13 is a plan view of the base or work support of a sewing machine embodying my invention, the standard being shown in horizontal section.

Like reference numerals designate corresponding parts throughout the several figures of the drawings.

In the drawings 5 designates the frame base or work support of a sewing machine embodying my invention and which includes the usual frame standard 6 supporting an overhanging arm 7 and the sewing head 8 mounted on the free end of said arm.

A main rotary shaft 9 is journaled in the overhanging arm, and the needle bar 10 vertically reciprocable in the sewing head and carrying the needle 11, is given a complete reciprocation for each rotation of the shaft 9 by the driving connections generally designated 12.

Figure 1:
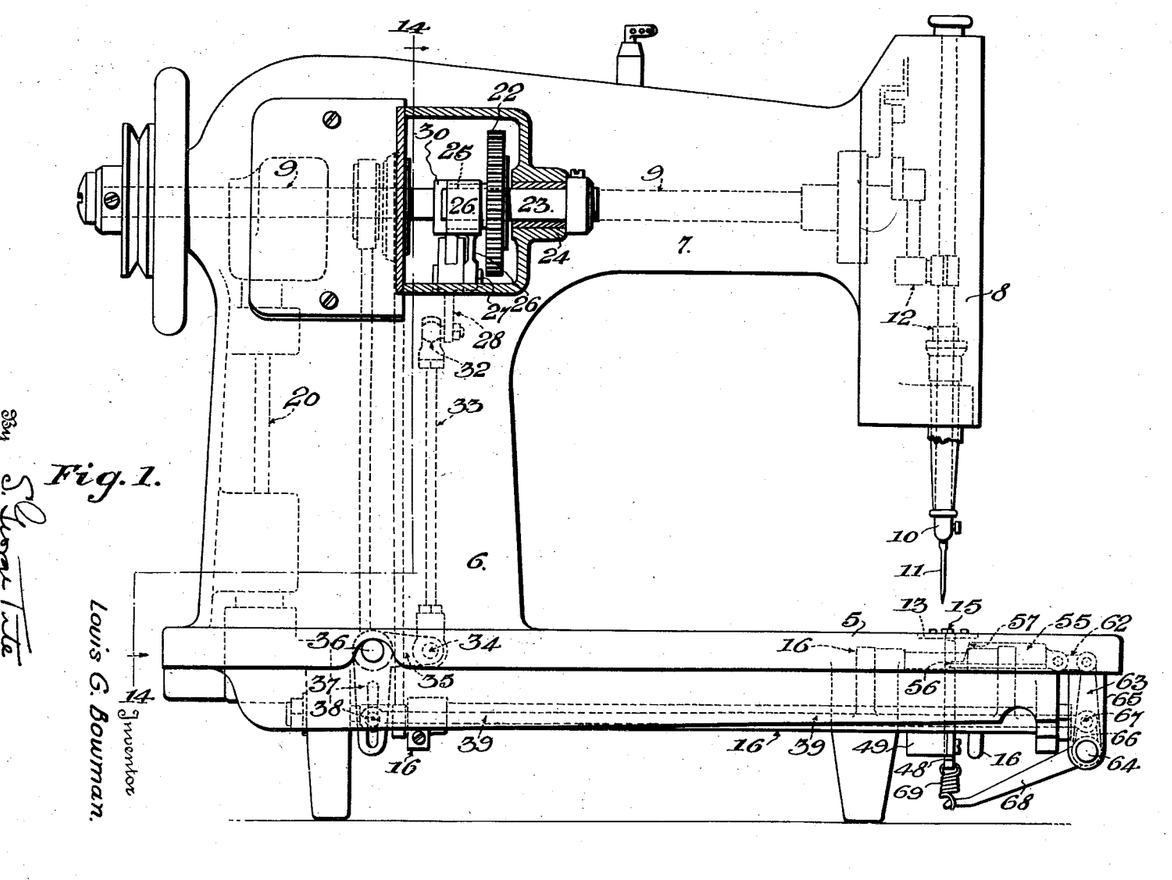
Figure 1 is a rear elevation of a sewing machine embodying my invention.

The throat plate 13 is mounted on the work support 5 and is slotted as at 14 to accommodate the intermittent 4-motion feed dog 15 to which feed movement is imparted by devices generally designated 16, and to which lift movement is imparted by devices generally designated 17, said devices 16 and 17 having the usual connection with the rotary shaft 9 as indicated in dotted lines in Figure 1 of the drawings. A presser foot 18 cooperates with the feed dog in the usual manner and beneath the throat plate is mounted a looper or other complemental stitch forming means 19 driven by connections 20 from the rotary shaft 9.

All of the parts above described will be recognized as conventional, except insofar as they combine with the pinking mechanism to be described hereinafter, and the details of construction of these parts form no part of my present invention.

In the practical development of the invention I secure upon the main shaft 9 a driving gear 21 which meshes with a gear 22 secured upon a jack shaft 23 rotatable in a bearing 24 provided therefor in the standard and overhanging arm 6, 7. The gears 21 and 22 have a 1-to-2 ratio so that the jack shaft is rotated once for each two rotations of the main shaft. See Figures 1, 14 and 15.

Figures 14, 15, 16, 17, 18:
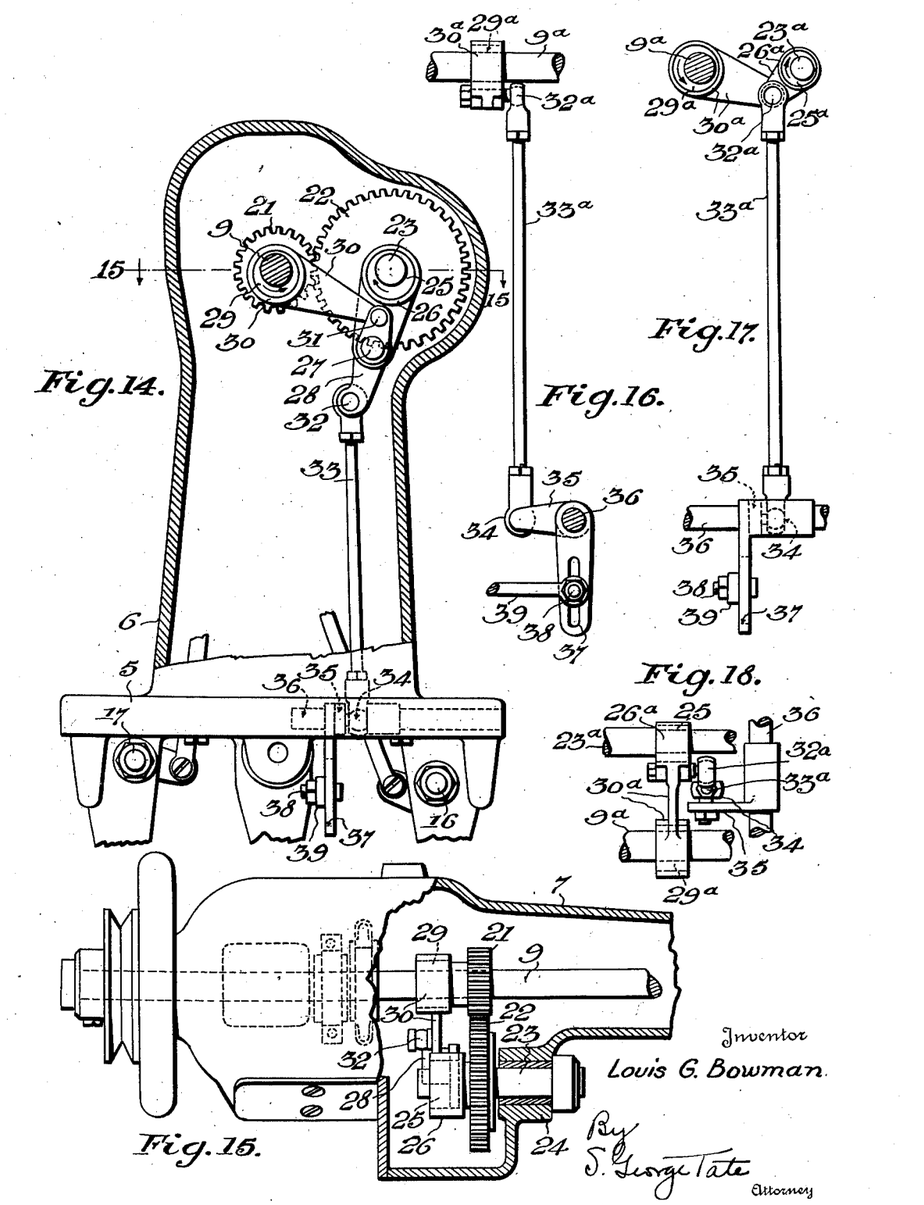
Figure 14 is a vertical cross section taken on the line 14—14 on Figure 1, parts being shown in right side elevation.
Figure 15 is a fragmentary horizontal section taken on the line 15—15 on Figure 14, parts being shown in elevation.
Figures 16, 17 and 18 are front, right end and plan views respectively illustrating a modified form of the pinking or trimming knife or blade driving connections shown in Figures 14 and 15.
Figure 15:
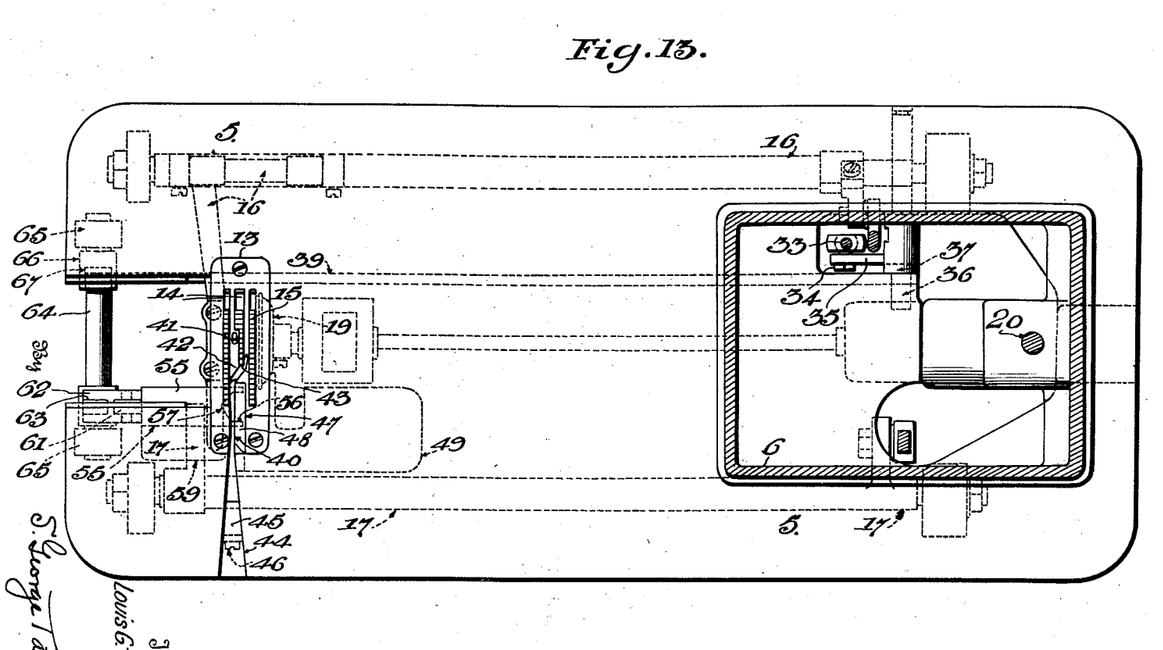

An eccentric 25 is secured upon the jack shaft 23 and is surrounded by a strap link 26. Pivoted on a stud 27 carried at the lower end of the strap link 26 is a rocker arm 28, the pivotal connection 27 being made intermediate the ends of the rocker arm so that one end thereof projects above and one below said connection.

An eccentric 29 is secured upon the main shaft 9 and is surrounded by a strap link 30 which is connected at 31 to the upper end of the rocker arm 28, the lower end of said rocker arm being connected as at 32 with the upper end of a thrust link 33 which extends downwardly through the standard 6 and is connected at its lower end as at 34 to one arm 35 of a bell crank lever which is fulcrumed as at 36 in the base of the machine frame. See Figures 1, 14 and 15.

The other arm 37 of the bell crank lever is slotted and has adjustably connected therewith, as indicated at 38, a knife or blade actuator rod 39.

The parts above described provide a sort of driving connection between the shafts 9 and 23 and the thrust link 33, the timing of the gears 21 and 22 and the relation of the eccentrics 29 and 25 being such that a full stroke is imparted to the thrust link 33 for each two strokes of the needle 11, the intermediate strokes being so shortened as to be ineffective to cause a full cutting stroke of the pinking or trimming devices to be described hereinafter. It will be understood that because of the difference in speed of their rotation the eccentrics 29 and 25 will cooperate with the linkage in a counteracting action and will serve to impart a full stroke to the thrust link 33 only when the effects of said eccentrics are compounded, namely, once during each two rotations of the shaft 9 or each two strokes of the needle 11.

In Figures 16, 17 and 18 of the drawings, I have disclosed a slightly modified linkage connection between the eccentrics and the thrust link. In this form of driving connection the main and jack shafts 9a and 23a have their eccentrics 29a and 25a surrounded by strap links 30a and 26a directly connected by a common connection 32a with the thrust link 33a. This construction is somewhat simplified and serves the purpose of imparting to the thrust link one full stroke for each two rotations of the main shaft as in the form of driving connection previously described.

Figure 19:
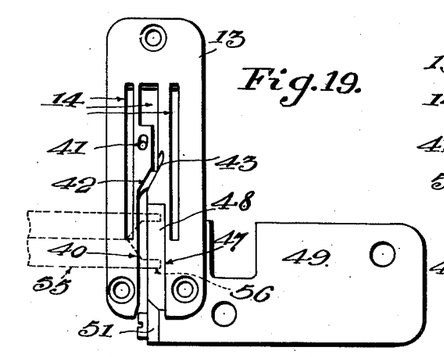
Figure 19 is a plan view illustrating a form of throat plate embodied in the invention together with the mounting therefor, the relation of the pinking or trimming knife or blade being indicated in dotted lines.
Figure 20:
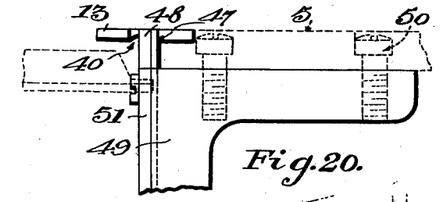
Figure 20 is a front elevation of the parts shown in Figure 19.

In addition to the feed dog accommodating slot 14 the throat plate 13 is provided at its approach end with a feed-in slotway 40 which is in line with the needle aperture 41. The slotway 40 terminates just in advance of the needle aperture 41 in an upwardly and laterally effective pinked or trimmed edge lifter slotway 42 into which the central feed dog slot 14 extends slightly as at 43 so that the feed dog portion extending into the slotway 42 will assist in effecting the deflection of the pinked or trimmed edge or edges of the material from the vertical position in which the pinking or trimming operation is effected into the horizontal plane of the material being seamed in which position it is desired said edges shall ultimately rest. See Figures 13, 19 and 20.

When properly mounted the slotway 40 in the throat plate registers with a feed-in guide grooveway 44 formed in the work support or base 5 in which grooveway is mounted an edge guide or gauge member 45 adjustably supported as at 46 upon the base so that the elevation of the gauge, and consequently the effective depth of the grooveway, may be varied at will. See Figures 2, 6, 7 and 13.

At the right hand side of the slotway 40 the throat plate is cut away or recessed as at 47 to accommodate the positioning of a ledger blade 48 supported vertically on a supporting bracket 49 secured as at 50 to the base or work support 5 and having its edges slidably guided in a grooveway formed between guide plates 51 secured to said bracket. See Figures 3, 6, 7, 10, 11, 12 and 19.

Figure 21:
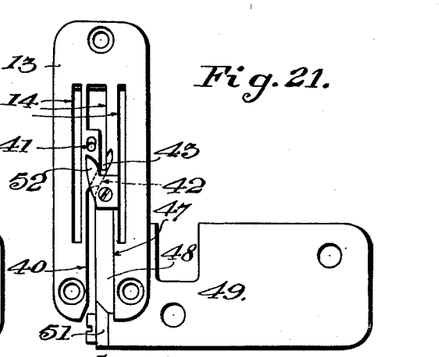
Figures 21 and 22 are views similar to Figures 19 and 20 and illustrate another form of throat plate embodied in the invention.
Figure 22:
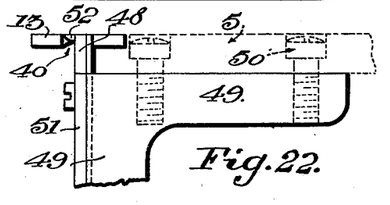
Figures 23, 24, 25, 26:
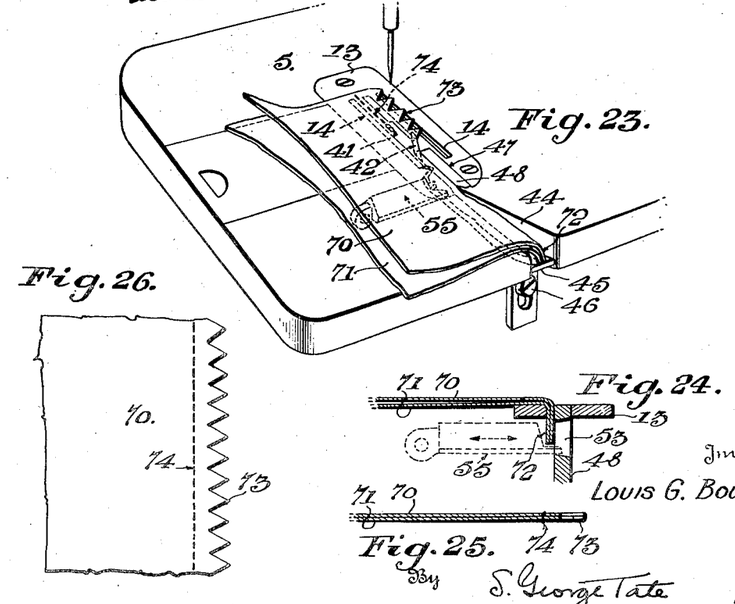
Figure 23 is a somewhat diagrammatic perspective view illustrating a pinking and seaming operation upon body fabrics superposed in edge registered relation, the fabric bodies proper being disposed at the left of the needle and the pinked or trimmed body fabric edge portion being extended to the right of the needle.
Figure 24 is a detail section illustrating the edge-turned pinking or trimming step.
Figure 25 is a detail section of the seam after it has been stitched.
Figure 26 is a plan view of the completed seam shown in process of formation in Figures 23, 24 and 25.
Figure 27:
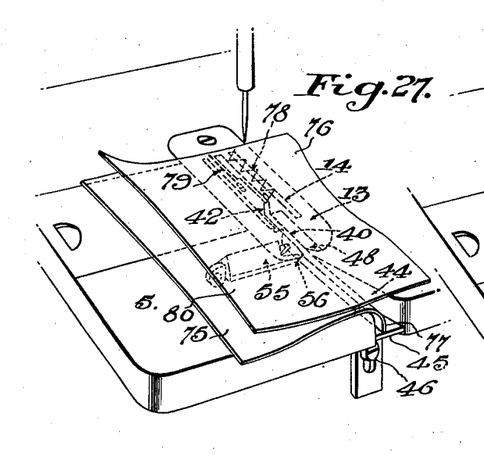
Figure 27 is a somewhat diagrammatic perspective view illustrating a pinking and seaming operation upon body fabrics in edge overlapped relation, the fabric bodies proper being disposed at opposite sides of the needle and the lowermost edge portion forming a part of the body fabric to the left of the needle alone being first down turned and pinked or trimmed and then extended to the right of the needle.

In Figures 21 and 22 of the drawings, I have illustrated a slightly modified form of throat plate in which is provided a supplemental guide tongue 52 which is secured to the throat plate at the right hand side of the slotway portion 42 and extends over and to the left of said portion as clearly illustrated in Figure 21 of the drawings. It will be noted that the left hand edge of the tongue 52 is positioned slightly to the left of the needle aperture 41 the purpose for which positioning will become apparent as the description progresses.

Figures 2, 3, 4, 5:
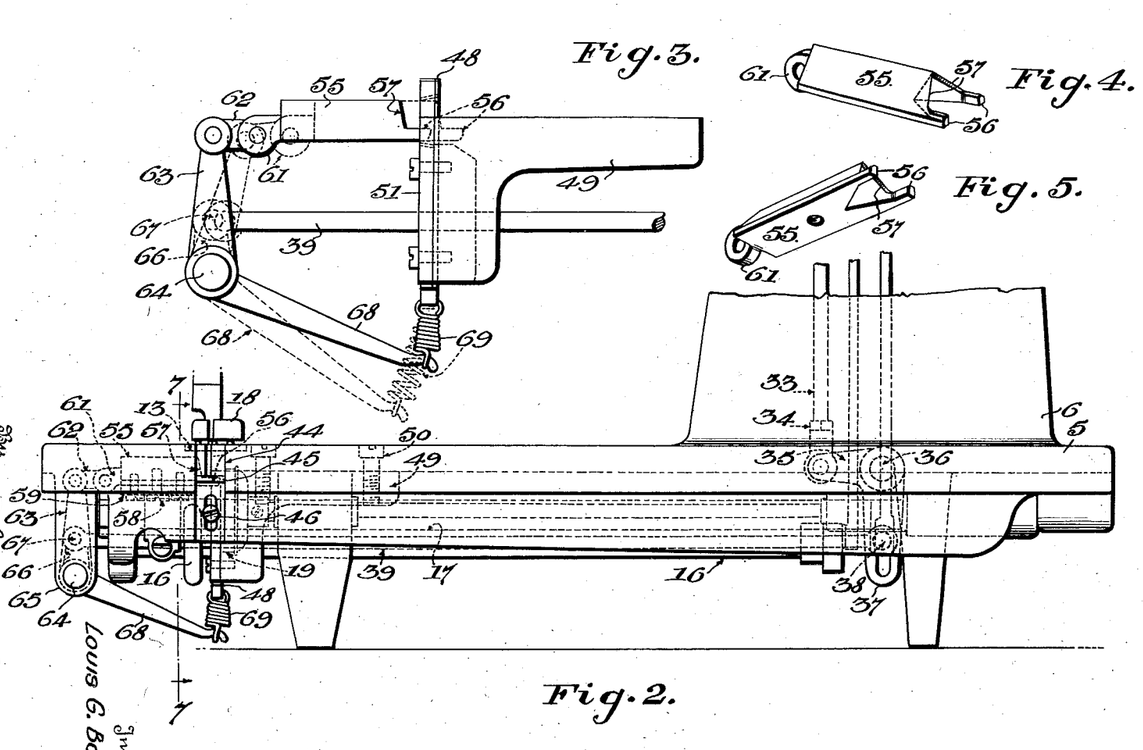
Figure 2 is a front elevation, the overhanging arm and supporting standard being broken away.
Figure 3 is a detail front elevation illustrating the ledger blade, the reciprocable pinking or trimming knife and the tension applying and relieving means, the knife retracted tension relieved position being shown in full lines and the knife projected or pinking or trimming tension applied position being shown in dotted lines.
Figures 4 and 5 are detail perspective views illustrating the pinking or trimming knife or blade.
Figure 6:
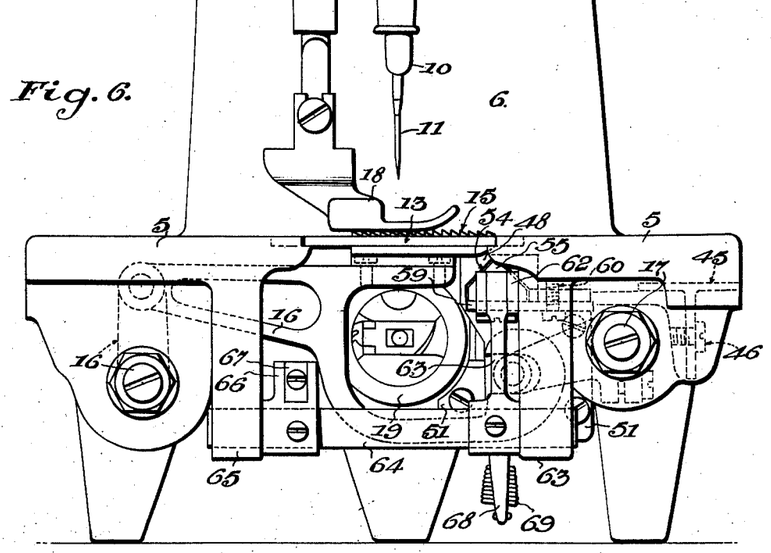
Figure 6 is a left side elevation of the parts shown in Figure 2.
Figures 7, 8:
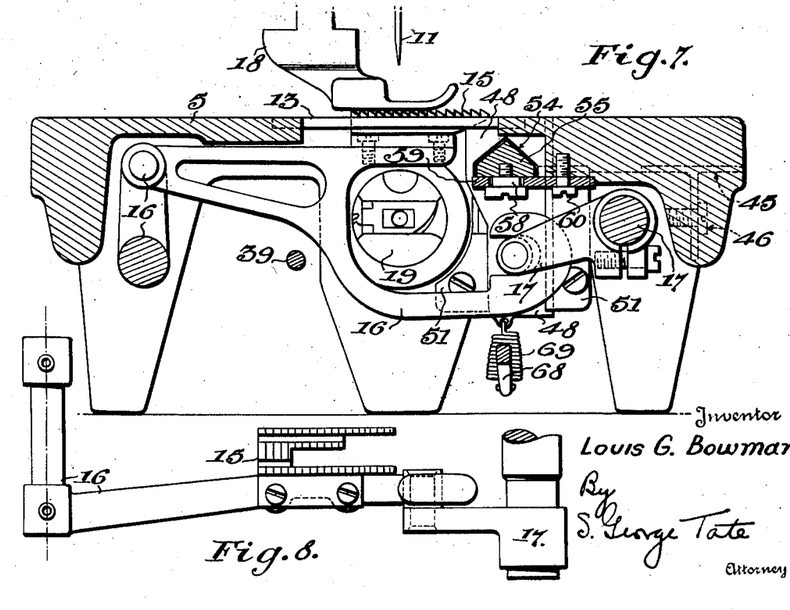
Figure 7 is a vertical cross section taken on the line 7—7 on Figure 2.
Figure 8 is a detail plan view illustrating the 4-motion feed dog and its support.
Figure 9:
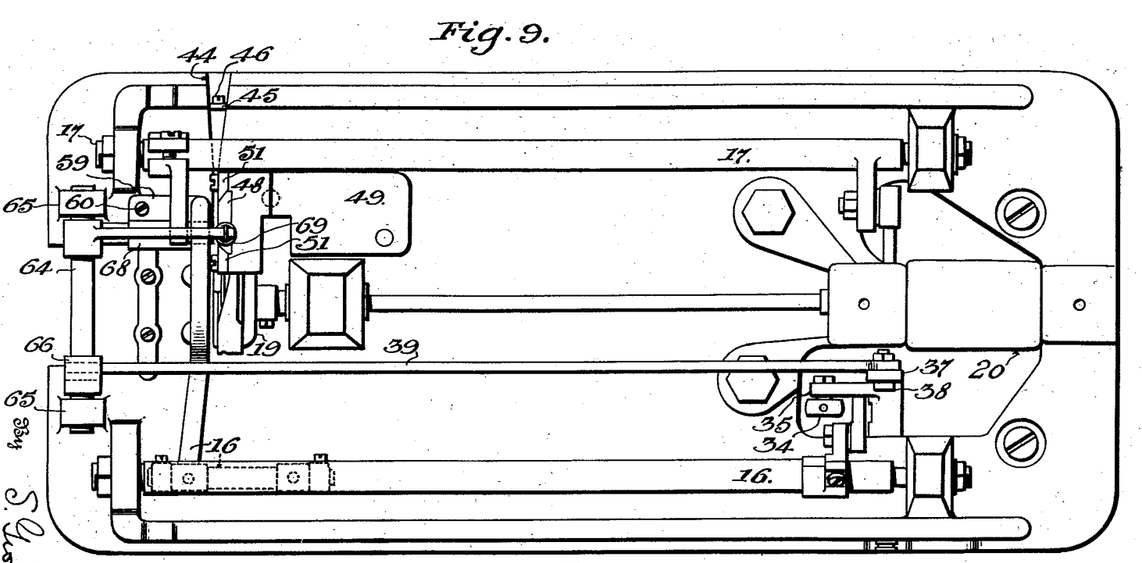
Figure 9 is an inverted plan view.
Figures 10, 11:
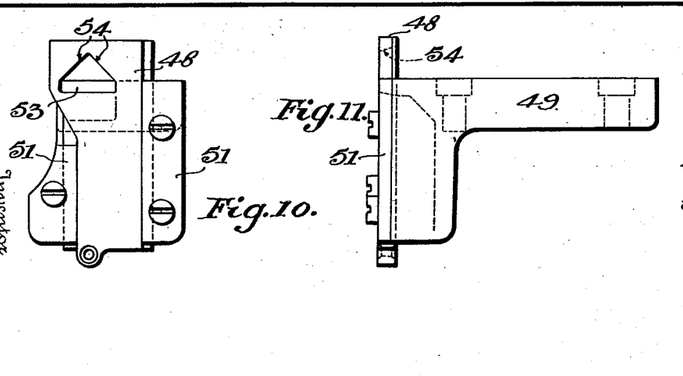
Figures 10, 11 and 12 are left side, front and plan views respectively of the slidable ledger blade and its mounting.
Figure 12:
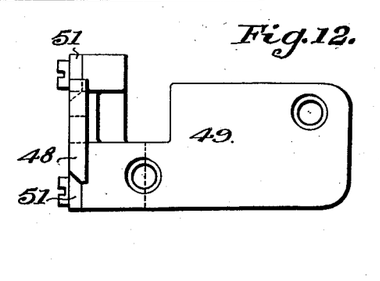

The ledger blade 48 is provided with a pinking or trimming knife accommodating opening 53 defined at its upper limits by cutting edges 54 positioned to form an inverted V, and into and out of this opening the knife or blade 55 is alternately projected and retracted in effecting the pinking or trimming operation. The knife 55 has one end shaped to form extension fingers 56 which always project into the opening 53 and beveled cutting edges 57 shaped to cooperate in shearing relation with the cutting edges 54 of the ledger blade. The knife 55 is slidably mounted as at 58 upon a supporting plate 59 secured as at 60 to the machine base 5 as illustrated in Figures 2, 7 and 13.

At its other end the knife 55 is provided with an apertured ear 61 which is link connected as at 62 to one arm 63 of a bell crank lever secured upon a rock shaft 64 journaled in bearing pieces 65 depending from the machine base 5. Another crank arm 66 is secured upon the rock shaft 64 and to this crank arm the pinking or trimming knife or blade actuator rod 39 is secured as indicated at 67. See Figures 1, 2, 6 and 13.

The remaining arm 68 of the bell crank lever carried by the rock shaft 64 extends to a point beneath the ledger blade 48 and is connected to the ledger blade through the medium of a close coiled spring 69. It will be apparent that as a thrust link 33 or 33a is given a full stroke, once for each two strokes of the needle 11, it will act, through the bell crank lever 35, 37, the actuator rod 39 and the crank connections 66, 64, 63, to force the knife or blade 55 into cutting relation with the ledger blade 48. On alternate needle strokes the thrust link connected linkage will act to impart a short stroke only to the knife or blade 55 insufficient to bring about a cutting relation with the ledger blade 48.

As the bell crank arm 63 moves to force the cutting edges 57 and 54 into shearing relation the connected bell crank arm 68 will move downwardly and act through the spring 69 to yieldably hold said edges in shearing relation. It is undesirable that the cutting edges should constantly be subjected to this yieldable tension and upon retraction of the knife or blade 55 the arm 68, acting through the close coil spring 69 will force the ledger blade 48 upwardly and will release the tension, bringing about a relief between the cutting edges 57 and 54. See Figures 2 and 3.

The advantages of my improved combined pinking and seaming mechanism should be apparent to those skilled in the art. The mounting of all mechanism beneath the machine base or work support does away with all obstructions above said base or support and the machine may be employed at will for ordinary sewing operations or for operations including pinking or trimming without the necessity of removing or adjusting any parts. It will be obvious too that the mechanisms described are meritoriously compact, sturdy, and simple in construction.

In operation the body fabric or body fabrics are fed forwardly over the work support or base 5 with the edge or edges thereof to be pinked or trimmed turned downwardly into the grooveway 44 provided in the base, the gauge plate 45 serving to control the depth to which said edge will extend down into the grooveway. As the material is fed along, the vertically turned edge or edges will pass into the throat plate slotway 40 and into the field of operation of the pinking or trimming edges 57 and 54, being pinked or trimmed in a manner well understood in the art.

After being pinked or trimmed the previously vertically disposed material edge or edges come under the influence of the slotway portion 42 which serves to deflect said pinked or trimmed edge or edges to the horizontal position in the plane of the body fabrics in which it is desired they should permanently lie. After passage through the slotway portion 42 the seaming step of the operation takes place and the needle 11 and the complemental stitch forming device generally designated 19 stitch the pinked or trimmed seam.

My improved combined pinking or trimming and seaming mechanism opens a field for forming various novel seam structures and my invention embraces several such novel forms of seams and novel methods of forming them, which will now be described.

In Figures 23 through 26, I have disclosed a simple form of pinked or trimmed seam which will be recognized as conventional but which, as herein disclosed, is formed by a new and useful method which consists in, first, bringing the body fabrics into superposed relation with their edge portions in registry or approximately so; second, turning the superposed edge portions of the body fabrics out of the general plane of the fabrics; third, pinking or edge-trimming the body fabric edge portions while thus turned; fourth, returning the pinked or trimmed edge portions to the general plane of the body fabrics; and finally uniting the body fabrics by a line of stitching paralleling the pinked or trimmed edge portions. The seam shown in the process of formation in Figure 23 and complete in Figures 25 and 26, may be made by hand or by my improved machine equipped with the throat plate disclosed in detail in Figure 19 of the drawings. In these figures the superposed body fabrics are shown as both lying at the left side of the stitching line and are designated 70 and 71, the edge portions which are turned out of the plane of the body fabrics at 72, the pinked or trimmed edge portions at 73, and the line of stitching at 74.

Figures 28, 29, 30, 31, 32, 34, 35, 36, 37:
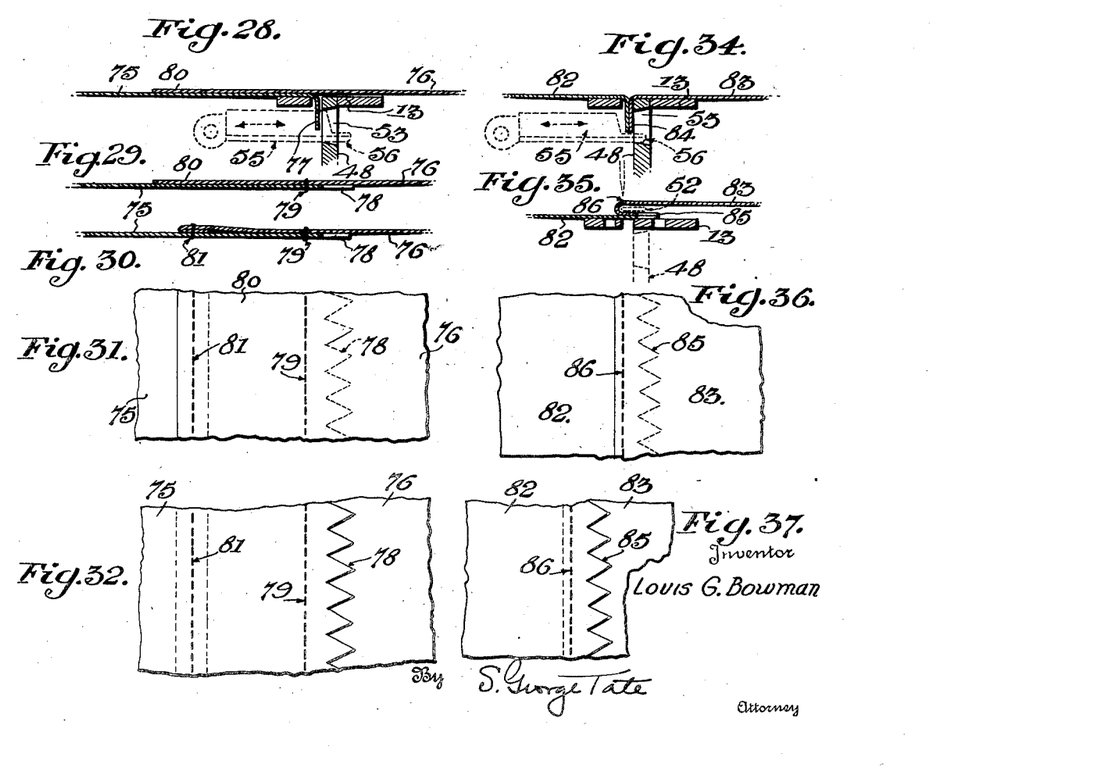
Figure 28 is a detail section illustrating the step of pinking or trimming the single edge portion of the body fabric.
Figure 29 is a detail section illustrating the condition of the seam after the first stitching operation.
Figure 30 is a detail section illustrating the seam completed by the final edge folding and stitching operation.
Figures 31 and 32 are top and inverted plan views of the completed seam shown in process of formation in Figures 27, 28, 29 and 30.
Figure 34 is a detail section illustrating the step of pinking or trimming the abutted body fabric edge portions.
Figure 35 is a detail section illustrating the stitching step by which the seam is completed.
Figures 36 and 37 are top and inverted plan views of the completed seam shown in process of formation in Figures 33, 34 and 35.
Figure 33:
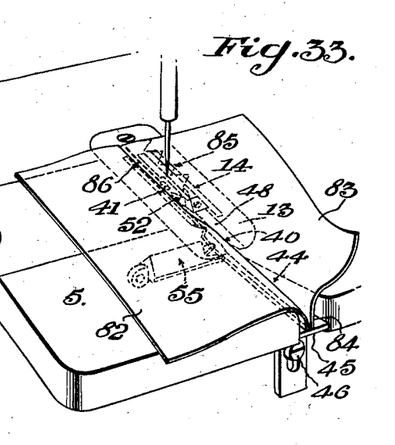
Figure 33 is a somewhat diagrammatic perspective view illustrating a pinking and seaming operation upon body fabrics brought together from opposite sides of the needle with their edge portions down turned and abutting during the pinking or trimming operation and then flattened to the right of the needle during the stitching which serves to unite the body fabrics.
Figures 38, 43:
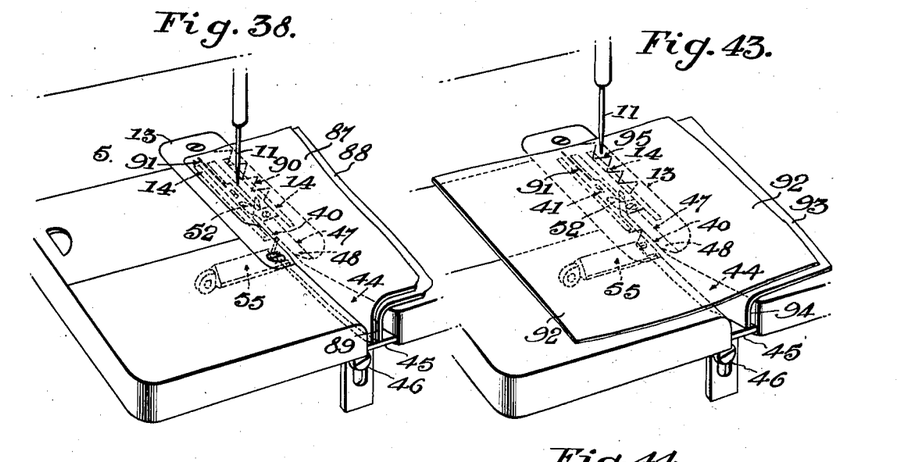
Figure 38 is a somewhat diagrammatic perspective view illustrating a pinking and seaming operation upon body fabrics superposed in edge registered relation, the fabric bodies proper being disposed at the right of the needle and the pinked or trimmed edge portions also being extended to the right of the needle.
Figure 43 is a somewhat diagrammatic perspective view illustrating a pinking and seaming operation upon body fabrics in edge overlapped relation, the fabric bodies proper being disposed at opposite sides of the needle and the lowermost edge portion forming a part of the body fabric to the right of the needle alone being first down turned and pinked or trimmed and then extended to the right of the needle.
Figure 39:
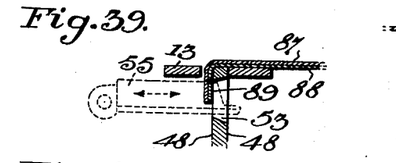
Figure 39 is a detail section illustrating the edge turned pinking or trimming step.
Figure 40:
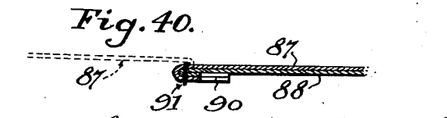
Figure 40 is a detail section illustrating the seam completed by the stitching step, the opened out condition of the seam being indicated in dotted lines.
Figure 41:
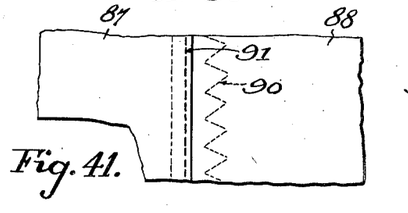
Figures 41 and 42 are top and inverted plan views of the completed seam shown in process of formation in Figures 38, 39 and 40.
Figure 42:
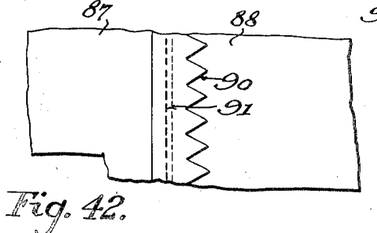

In Figures 27 through 32 of the drawings, I have illustrated a novel 2-line seam and a novel method of forming the same. This seam may be formed by hand or by my improved machine equipped with the throat plate disclosed in detail in Figure 19. This method consists in, first, bringing body fabrics into overlapped edge relation; second, turning one overlapped edge portion out of the general plane of the body fabrics; third, pinking or trimming the turned edge portion; fourth, returning the pinked or trimmed edge portion to the general plane of the body fabrics; fifth, uniting the body fabrics by a line of stitching paralleling the pinked or trimmed edge portion; sixth, folding in the remaining overlapped body fabric edge portion; and finally securing the infolded edge portion to the adjacent body fabrics by a line of stitches. In the figures referred to the body fabrics proper are shown as lying at opposite sides of the stitching line and are respectively designated 75 and 76. The edge portion of the body fabric 75 is shown turned out of the general plane of the body fabrics as at 77 and pinked or trimmed as at 78, thereafter being returned to the general plane of the body fabrics after which the body fabrics are united by a line of stitching 79 paralleling the pinked or trimmed edge portion. The overlapped edge portion 80 of the body fabric 76 is then folded under as indicated in Figure 30 and secured by a line of stitching 81 to the body fabric 75 as indicated in Figures 30, 31 and 32.

In Figures 33 through 37 I have illustrated another novel form of seam and a novel method of forming said seam. This method consists in, first, disposing the body fabrics 82 and 83 at opposite sides of the stitching line and in a common plane with the edge portion of each turned out of the general plane of the fabric and opposed to and abutting the similarly turned edge portion of the other fabric as illustrated at 84 in Figures 33 and 34; second, pinking or trimming the turned and abutting edge portions; third, returning the edge portions to the general plane of the fabrics; and finally uniting the fabrics by a line of stitches 86 paralleling the pinked or trimmed edge portions. The completed seam is illustrated in Figures 36 and 37 and it will be obvious that by reason of the manner of positioning and securing the pinked or trimmed edge portions, said portions are compelled to always retain their direction of projection. It will also be noted that this seam is formed in a single continuous operation and is formed open and does not have to be opened out as do seams of the type disclosed in Figures 25 and 26. This seam may be formed by hand or by my improved machine equipped with the throat plate shown in detail in Figure 21. When this throat plate is used the slotway portion 42 returns the pinked edge portions 84, 85 to the general plane of the fabrics and the tongue 52 positions the resultant fold formed by the fabric portions 83, 84 slightly to the left of the needle so as to assure stitching through said fold as shown.

In Figures 38 through 42, I have disclosed another novel seam and a novel method of forming the same. This seam may be formed by hand or by my improved machine equipped with the throat plate disclosed in detail in Figure 21. This method consists in, first, bringing the body fabrics 87 and 88 into superposed relation (in this showing to the right of the stitching line) with their edge portions in registry or approximately so; second, turning the superposed edge portions of the body fabrics out of the general plane of the fabrics as indicated at 89; third, pinking or edge-trimming the body fabric edge portions while thus turned as indicated at 90; fourth, returning the pinked or trimmed edge portions to the general plane of the body fabrics but in superposed relation to the body fabrics to form an edge fold; and finally uniting the body fabrics and the edge portions by a line of stitching passing through the edge fold as indicated at 91. When this seam is formed by my improved machine the tongue 52 acts during the returning of the edge portions to the general plane of the body fabrics to so position the resultant fold as to assure penetration by the needle.

Figures 44, 45, 46:
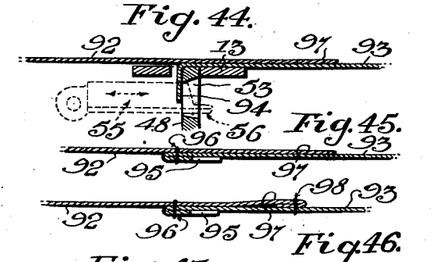
Figure 44 is a detail section illustrating the step of pinking or trimming the single edge portion of the body fabrics.
Figure 45 is a detail section illustrating the condition of the seam after the first stitching operation.
Figure 46 is a detail section illustrating the seam completed by the final edge folding and stitching operation.
Figure 47:
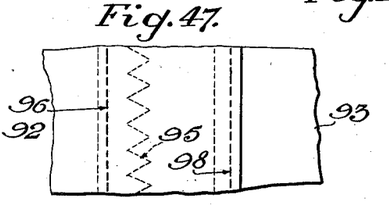
Figures 47 and 48 are top and inverted plan views of the completed seam shown in the process of formation in Figures 43, 44, 45 and 46.
Figure 48:
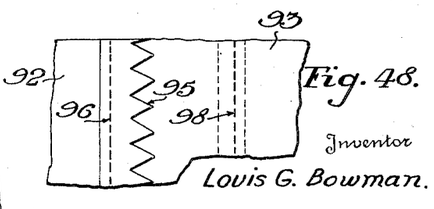

In Figures 43 through 48 I have illustrated another novel 2-line seam and a novel method of forming the same. This seam may be formed by hand or by my improved machine equipped with the throat plate disclosed in detail in Figure 21. This method consists in, first, bringing body fabrics 92 and 93 lying at opposite sides of the stitching line into overlapped edge relation; second, turning the overlapped edge portion of the body fabric 93 out of the general plane of the body fabrics as indicated at 94; third, pinking or trimming the turned edge portion as indicated at 95; fourth, returning the pinked or trimmed edge portion to the general plane of the fabrics and in superposed relation to the body fabric proper 93 of which it forms a part forming a resultant edge fold; fifth, uniting the body fabrics by a line of stitching 96 paralleling the pinked or trimmed edge portion and passing through the body fabric 92 and the edge fold as shown in Figure 45; sixth, folding in the overlapped body fabric edge portion 97 of the body fabric 92; and finally securing the infolded edge portion to the adjacent portion of the body fabric 93 by a line of stitches designated 98. When this seam is formed by my improved machine the tongue 52 acts during the returning of the pinked or trimmed edge portion to the general plane of the body fabrics to so position the resultant edge fold as to assure penetration by the needle.

It is thought that from the foregoing description, considered in connection with the accompanying drawings, the novel details of construction, the manner of use and the advantages of my improved machine, methods and seams will be readily apparent to those skilled in the art.

It is of course to be understood that the details of construction and arrangement of parts may be variously changed and modified without departing from the spirit and scope of my invention.

I claim:—

1. In a combined seaming and trimming machine, a work supporting base, a vertically reciprocating needle, and work trimming means disposed in advance of the needle and beneath the base and including a vertically disposed ledger blade and a cooperating horizontally reciprocable trimmer blade.

2. In a combined seaming and trimming machine, a work supporting base, a reciprocating needle, a throat plate having provision to permit passage therethrough of said needle, work trimming means disposed in advance of the needle and beneath said base, and means including a longitudinal guide slot formed in said throat plate and terminating in a laterally extended guide slot portion to guide a work edge portion vertically to and through said trimming mechanism and for thereafter returning said portion to the plane of the work support.

3. In a combined seaming and trimming machine, a work supporting base, a vertically reciprocating needle, work trimming means disposed in advance of the needle and beneath the base and including a vertically disposed ledger blade and a cooperating horizontally reciprocable trimmer blade, and means for moving the ledger blade into and out of tensioned cutting relation with the trimming blade.

4. In a combined seaming and trimming machine, a work supporting base, a reciprocating needle, a throat plate having provision to permit passage therethrough of said needle, work trimming means disposed in advance of the needle and beneath said base, and means including a longitudinal guide slot formed in said throat plate and terminating in a laterally extended guide slot portion to guide a work edge portion vertically to and through said trimming mechanism and for thereafter returning said portion to the plane of the work support, said guiding means including a fold positioning tongue carried by said throat plate and overlying and traversing said guide slot portion.

5. In a combined seaming and trimming machine, a work supporting base, a reciprocating needle, work trimming means disposed in advance of the needle and beneath said base, means to guide a work edge portion vertically to and through said trimming mechanism and for thereafter returning said portion to the plane of the work support, and adjustable means to control the depth of work edge portion said guide means is capable of accommodating.

6. In a combined seaming and pinking machine, a work supporting base, a vertically reciprocating needle, and work pinking means disposed in advance of the needle and beneath the base and including a vertically disposed ledger blade having V-shaped cutting edges and a cooperating horizontally reciprocable pinking blade having V-shaped cutting edges for engaging the cutting edges of the ledger blade.

7. In a combined seaming and pinking machine, a work supporting base, a vertically reciprocating needle, and work pinking means disposed in advance of the needle and beneath the base and including a vertically disposed ledger blade having V-shaped cutting edges and a cooperating horizontally reciprocable pinking blade having V-shaped cutting edges for engaging the cutting edges of the ledger blade, and means for yieldably holding the cutting edges of the blades in cutting relation.

8. In a combined seaming and pinking machine, a work supporting base, a vertically reciprocating needle, and work pinking means disposed in advance of the needle and beneath the base and including a vertically disposed ledger blade having V-shaped cutting edges and a cooperating horizontally reciprocable pinking blade having V-shaped cutting edges for engaging the cutting edges of the ledger blade, and means for yieldably holding the cutting edges of the blades in cutting relation during actual cutting intervals and for at other times relieving said yieldable engagement.

9. In a combined seaming and trimming machine, a work supporting base, a standard and overhanging arm supported on the base, a main shaft rotatably supported in the arm, a reciprocating needle, work trimming means disposed in advance of the needle and beneath the base and including a reciprocable trimmer blade, means operated by the main shaft for reciprocating the needle, and means operated from the main shaft and mounted wholly in the arm and standard and beneath the base for imparting to the trimmer blade reciprocations less in number than the needle reciprocations.

10. In a combined seaming and trimming machine, a work supporting base, a reciprocating needle, a throat plate having provision to permit passage therethrough of said needle, work trimming means disposed in advance of the needle and beneath said base, and means including a longitudinal guide slot formed in said throat plate and terminating in a laterally extended guide slot portion to guide a work edge portion vertically to and through said trimming mechanism and for returning said portion to the plane of the work support in advance of said needle.

11. In a combined seaming and trimming machine, a work supporting base, a reciprocating needle, a throat plate having provision to permit passage therethrough of said needle, work trimming means disposed in advance of the needle and beneath said base, and means including a longitudinal guide slot formed in said throat plate and terminating in a laterally extended guide slot portion to guide a work edge portion vertically to and through said trimming mechanism and for returning said portion to the plane of the work support in advance of said needle, said guiding means including a fold positioning tongue carried by said throat plate and overlying and traversing said guide slot portion.

12. In a combined seaming and trimming machine, a reciprocating needle, a ledger blade, a reciprocable trimmer blade cooperating with the ledger blade for trimming purposes, and means for reciprocating the trimmer blade including a bell crank lever having one arm thereof connected to the trimmer blade, and means connecting the bell crank lever with the ledger blade for moving the ledger blade into cutting relation to the trimmer blade only during actual cutting intervals.

13. In a combined seaming and trimming machine, a reciprocating needle, a ledger blade, a reciprocable trimmer blade cooperating with the ledger blade for trimming purposes, and means for reciprocating the trimmer blade including a bell crank lever having one arm thereof connected to the trimmer blade, and a spring connecting the remaining arm of the bell crank lever and the ledger blade and serving to yieldably hold the trimmer and ledger blades in cutting relation during actual cutting relation.

14. In a combined seaming and trimming machine, a reciprocating needle, a ledger blade, a reciprocable trimmer blade cooperating with the ledger blade for trimming purposes, and means for reciprocating the trimmer blade including a bell crank lever having one arm thereof connected to the trimmer blade, and a close coiled spring connecting the remaining arm of the bell crank lever and the ledger blade and serving to yieldably hold the trimmer and ledger blades in cutting relation during actual cutting relation and at other times to force the ledger blade out of such relation.

15. In a combined seaming and trimming machine, a work supporting base, a standard and overhanging arm supported on the base, a main shaft rotatably supported in the arm, a reciprocating needle, work trimming means disposed in advance of the needle and beneath the base and including a reciprocable trimmer blade and a cooperating ledger blade, means for reciprocating the needle, and means operated from the main shaft and mounted wholly in the arm and standard and beneath the base for reciprocating the trimmer blade and for yieldably forcing the blades into cutting relation during actual cutting intervals.

16. In a combined seaming and trimming machine, a work supporting base, a standard and overhanging arm supported on the base, a main shaft rotatably supported in the arm, a reciprocating needle, work trimming means disposed in advance of the needle and beneath the base and including a reciprocable trimmer blade and a cooperating ledger blade, means for reciprocating the needle, and means operated from the main shaft and mounted wholly in the arm and standard and beneath the base for reciprocating the trimmer blade and for yieldably forcing the blades into cutting relation during actual cutting intervals and for at other times forcing said blades out of cutting relation.

17. In a combined seaming and trimming machine, a work supporting base having a vertically disposed work edge guideway, a reciprocating needle, a throat plate having a needle aperture and a work edge guideway registering with the base guideway and terminating in advance of the needle in an upwardly and laterally directed portion for returning a previously vertically fed work edge portion to the general plane of the work supporting surface, and means beneath the base for trimming work edge portions while travelling through the vertical guideway.

18. In a combined seaming and trimming machine, a work supporting base having a vertically disposed work edge guideway, a reciprocating needle, a throat plate having a needle aperture and a work edge guideway registering with the base guideway and terminating in advance of the needle in an upwardly and laterally directed portion for returning a previously vertically fed work edge portion to the general plane of the work supporting surface, and means beneath the base for trimming work edge portions while travelling through the vertical guideway, said throat plate including a tongue for cooperating with the upwardly and laterally directed guideway portion in forming a work edge fold and presenting said fold for penetration by the needle.

19. In a combined seaming and trimming machine, a work supporting base having a vertically disposed work edge guideway, a reciprocating needle, a throat plate having a needle aperture and a work edge guideway registering with the base guideway and terminating in advance of the needle in an upwardly and laterally directed portion for returning a previously vertically fed work edge portion to the general plane of the work supporting surface, means beneath the base for trimming work edge portions while travelling through the vertical guideway, and a gauge member adjustably mounted on said base and controlling the effective depth of the guideway.

20. In a combined seaming and trimming machine, a work supporting base having a vertically disposed work edge guideway, a reciprocating needle, a throat plate having a needle aperture and a work edge guideway registering with the base guideway and terminating in advance of the needle in an upwardly and laterally directed portion for returning a previously vertically fed work edge portion to the general plane of the work supporting surface, said throat plate also having feed dog accommodating slotways including a portion extending into the upwardly and laterally directed guideway portion, a work feed dog operating in the slotways and including a portion extending into the upwardly and laterally directed guideway portion to aid passage of work edge portions therethrough, and means beneath the base for trimming work edge portions while travelling through the vertical guideway.

21. In a combined seaming and trimming machine, a main rotary shaft, a reciprocating needle driven from the rotary shaft, a ledger blade, a trimmer blade for cooperating with the ledger blade, a vertically disposed guideway for the ledger blade, a horizontally disposed guideway for the trimmer blade, and a bell crank lever to which rocking motion is imparted from the main shaft, said lever having connection with the trimmer blade and the ledger blade for alternately reciprocating said blades in their respective guideways to alternately move them into and out of cutting relation.

22. In a combined seaming and trimming machine, a main rotary shaft, a reciprocating needle driven from the rotary shaft, a ledger blade, a trimmer blade for cooperating with the ledger blade, a vertically disposed guideway for the ledger blade, a horizontally disposed guideway for the trimmer blade, and a bell crank lever to which rocking motion is imparted from the main shaft, said lever having connection with the trimmer blade and the ledger blade for alternately reciprocating said blades in their respective guideways to alternately move them into and out of cutting relation, said connection being by way of link connection with said trimmer blade and by way of close coiled spring connection with said ledger blade.

23. In a combined seaming and trimming machine, a work supporting base, a standard and overhanging arm supported on the base, a main shaft rotatably supported in the arm. a reciprocating needle, means for imparting reciprocation to the needle from the main shaft, work trimming means disposed in advance of the needle and beneath the base and including a ledger blade and a reciprocable trimmer blade, and means operated from the main shaft and mounted wholly in said arm and standard and beneath said base for reciprocating the trimmer blade comprising a crank lever pivoted beneath the base and having connection with the trimmer blade, an actuator rod extending beneath the base and engaging the crank lever, a thrust link mounted in the standard, a bell crank lever pivotally mounted beneath the standard and having connection with the thrust link and the actuator rod, and means for imparting reciprocations to the thrust link from the main shaft.

24. In a combined seaming and trimming machine, a work supporting base, a standard and overhanging arm supported on the base, a main shaft rotatably supported in the arm, a reciprocating needle, means for imparting reciprocation to the needle from the main shaft, work trimming means disposed in advance of the needle and beneath the base and including a ledger blade and a reciprocable trimmer blade, and means operated from the main shaft and mounted wholly in said arm and standard and beneath said base for reciprocating the trimmer blade comprising a crank lever pivoted beneath the base and having connection with the trimmer blade, an actuator rod extending beneath the base and engaging the crank lever, a thrust link mounted in the standard, a bell crank lever pivotally mounted beneath the standard and having connection with the thrust link and the actuator rod, a jack shaft having driving connection with the main shaft, an eccentric on each of the main and jack shafts, and strap links surrounding the eccentrics and connected to the thrust link for reciprocating the same.

25. In a combined seaming and trimming machine, a work supporting base, a standard and overhanging arm supported on the base, a main shaft rotatably supported in the arm, a reciprocating needle, means for imparting reciprocation to the needle from the main shaft, work trimming means disposed in advance of the needle and beneath the base and including a ledger blade and a reciprocable trimmer blade, and means operated from the main shaft and mounted wholly in said arm and standard and beneath said base for reciprocating the trimmer blade comprising a crank lever pivoted beneath the base and having connection with the trimmer blade, an actuator rod extending beneath the base and engaging the crank lever, a thrust link mounted in the standard, a bell crank lever pivotally mounted beneath the standard and having connection with the thrust link and the actuator rod, a jack shaft, reduction gearing connecting the jack shaft in driven relation with the main shaft, an eccentric on each of the main and jack shafts, and strap links surrounding the eccentrics and connected to the thrust link for reciprocating the same and imparting to the trimmer blade reciprocations less in number than the reciprocations of the needle.

26. In a combined seaming and pinking machine, the combination of stitch forming means including a vertically reciprocable needle, means to support body fabrics with edge portions thereof in horizontal superposed relation, means to guide an edge portion of the body fabrics toward the needle in vertically turned relation, means to pink the vertically turned edge portion, and means to return the pinked edge portion to the general plane of the body fabrics in advance of the position of said needle.

27. In a combined seaming and pinking machine, the combination of stitch forming means including a vertically reciprocable needle, means to support body fabrics with edge portions thereof in horizontal superposed relation, means to guide an edge portion of the body fabrics toward the needle in vertically turned relation, means to pink the vertically turned edge portion, means to turn the pinked edge portion back into the general plane of the body fabrics and against the body fabric of which it forms a part forming a resultant edge fold, and means to position the edge fold for being penetrated by the needle.

28. In a combined seaming and pinking machine, the combination of stitch forming means including a vertically reciprocable needle, means to support body fabrics with edge portions thereof in horizontal superposed relation, means to guide an edge portion of the body fabrics toward the needle in vertically turned relation, means to pink the vertically turned edge portion, means to turn the pinked edge portion back into the general plane of the body fabrics and against the body fabric of which it forms a part forming a resultant edge fold, and a tongue member for assisting in the formation of the edge fold and serving to position the edge fold for being penetrated by the needle.

LOUIS G. BOWMAN.